US012729641B2

(12) United States Patent
Corvasce

(10) Patent No.: US 12,729,641 B2
(45) Date of Patent: Sep. 8, 2026

(54) SYSTEM FOR OPTIMIZING AN INTERNAL COMBUSTION ENGINE

(71) Applicant: CROW TECHNOLOGIES S.R.L., Barletta (IT)

(72) Inventor: Nicolò Michele Corvasce, Barletta (IT)

(73) Assignee: CROW TECHNOLOGIES S.R.L., Barletta (IT)

( * ) Notice: Subject to any disclaimer, the term of this patent is extended or adjusted under 35 U.S.C. 154(b) by 0 days.

(21) Appl. No.: 18/870,591

(22) PCT Filed: May 17, 2023

(86) PCT No.: PCT/IB2023/055070
§ 371 (c)(1),
(2) Date: Nov. 29, 2024

(87) PCT Pub. No.: WO2023/233230
PCT Pub. Date: Dec. 7, 2023

(65) Prior Publication Data

US 2025/0327417 A1 Oct. 23, 2025

(30) Foreign Application Priority Data

Jun. 1, 2022 (IT) ........................ 102022000011588

(51) Int. Cl.
*F02B 63/04* (2006.01)
*H02K 7/075* (2006.01)
(Continued)

(52) U.S. Cl.
CPC ........... *F02B 63/041* (2013.01); *H02K 33/16* (2013.01); *H02K 7/075* (2013.01); *H02K 7/1876* (2013.01)

(58) Field of Classification Search
CPC ...... F02B 63/041; H02K 33/16; H02K 7/075; H02K 7/1876
See application file for complete search history.

(56) References Cited

U.S. PATENT DOCUMENTS 4,317,058 A * 2/1982 Blalock .................. H02K 7/065 310/24
5,457,349 A 10/1995 Gifford
(Continued)

FOREIGN PATENT DOCUMENTS

JP 2001140669 A 5/2001
WO 2020218998 A1 10/2020

OTHER PUBLICATIONS

International Search Report and Written Opinion of the ISA for PCT/IB2023/055070, mailed Sep. 4, 2023, 20 pages.

*Primary Examiner* — Kevin A Lathers
(74) *Attorney, Agent, or Firm* — NIXON & VANDERHYE

(57) ABSTRACT

System for optimizing an internal combustion engine adapted to modify a common internal combustion engine, or a similar mechanical structure and which uses the same drive system, by applying a plurality of magnets; said system comprising: —at least a common internal combustion engine or a similar mechanical structure; —a plurality of pistons, adapted to move the drive shaft; at least a magnet (11), installed on the head of the piston (10), having a fixed polarity; —at least an electromagnet, installed above each piston; —at least an additional electric circuit (16); —at least a H bridge and a CPU (17), adapted to manage the inversion of polarity of the electromagnets; —at least an on-board computer, connected to the CPU (17), adapted to coordinate and optimize the inversion of polarity of the electromagnets; —one or more accumulators of the type already used on vehicles in circulation and however, with at least 12 V and with at least 3 Ah, charged by the dynamo fitted in the vehicle and/or from the external, by connecting to the power mains or with the other systems currently fitted in circulating electric vehicles; —at least a container (12), located above each piston (10), adapted to comprise—
(Continued)

therein—the electromagnet which moves the relative piston; —at least a system for cooling the electromagnet.

15 Claims, 3 Drawing Sheets

(51) Int. Cl.
*H02K 7/18* (2006.01)
*H02K 33/16* (2006.01)

(56) References Cited

U.S. PATENT DOCUMENTS

| | | | | |
|---|---|---|---|---|
| 8,991,356 | B2 * | 3/2015 | Pelmear | F02F 1/18<br>310/24 |
| 2011/0056444 | A1 * | 3/2011 | Im | H02K 33/16<br>123/2 |
| 2013/0207487 | A1 | 8/2013 | Therriault et al. | |

* cited by examiner

SYSTEM FOR OPTIMIZING AN INTERNAL COMBUSTION ENGINE

CROSS-REFERENCE TO RELATED APPLICATIONS

This application is the U.S. national phase of International Application No. PCT/IB2023/055070 filed May 17, 2023, which designated the U.S. and claims priority to IT 102022000011588 filed Jun. 1, 2022, the entire contents of each of which are hereby incorporated by reference.

TECHNICAL FIELD

The invention relates to an innovative system for optimizing the conventional internal combustion engine. Thanks to the use of magnets and electromagnets, fuel combustion is replaced by the attraction and by the thrust of the pistons caused by the inversion of polarities of the magnetic fields, created through a current flow.

PRIOR ART

Internal combustion engines are by now very common in the automotive industry and in transportation in general. Almost all circulating vehicles are driven by an internal combustion engine, fueled using petrol, diesel or other fossil fuel.

The poor efficiency of internal combustion engines is well known by now, given the numerous mechanical and thermal dispersions present along the transmissions, the atmospheric pollution that they cause and the ever-increasing cost of fuel.

Therefore, most of the car makers are opting for the production of cars with electric or hybrid engines, to save on the costs of fuel and protect the environment.

The electric or hybrid technology, applied to the vehicles currently circulating, is based on high-voltage electric engines, even combined with internal combustion engines. However, in hybrid vehicles the former is not capable of replacing the latter for more than a few kilometers. Furthermore, the current combustion engines are provided with expensive high-voltage batteries, with a half-life of about 250,000 kilometers and characterized by significant disposal costs.

Therefore, being based on a low-voltage electric engine technology, besides being characterized by the marked saving on fuel costs, the present invention is also characterized by significant saving on the costs of materials, as well as on the costs for the maintenance that the vehicle will be subjected to in future.

As a matter of fact, an object of the invention is to provide a system for optimizing common internal combustion engines, using a plurality of magnets which can move pistons, thanks to an electric circuit, power-supplied by batteries with lower voltage with respect to those fitted in current electric or hybrid vehicles, provided with a H bridge which inverts the polarization of the electromagnets, inversion adjusted and optimized by a CPU and possibly by an on-board computer.

Said system is adapted to make the vehicle fully independent from fossil fuels, but also, in case of combination between an optimized fully electric engine with an internal combustion engine, to provide only partial contribution to the drive of the vehicle.

DESCRIPTION OF THE INVENTION

According to the present invention, a system is provided for optimizing a common internal combustion engine, or a similar mechanical structure and it uses the same drive system, which effectively solves the aforementioned problems.

The system in question was designed to convert the common internal combustion engines into electric engines, even using a mechanical structure similar to the internal combustion engine, by using the same drive system as the systems and technologies already installed in vehicles currently available in the market of vehicles currently in circulating and generally used in transportation and in which the system for transmitting motion to the wheels remains unchanged.

The present technology uses a normal internal combustion engine or a similar mechanical structure, comprising a plurality of pistons which move the drive shaft due to fuel combustion, transforming it into an electric or hybrid engine, even by combining the two types of engines, to improve the performance of the vehicle, reducing the consumption thereof.

In the system in question, the pistons of the engine remain unchanged with regard to their size, but a fixed polarity magnet is applied on their head. In an embodiment thereof, said magnet is preferably made of neodymium.

The magnet may be applied on said pistons in several ways. The most convenient one in terms of simplicity is gluing, given that it facilitates an easy application thereof and an easy removal should there arise the need to replace the magnet.

The magnet may be applied on the piston even through hot or cold welding (in this latter case, guaranteeing the wholeness of the magnet, by not overheating it, therefore guaranteeing greater evenness of the internal structure of the material).

A third variant of the system provides for that the piston be fully made of neodymium, or any other type of magnet, obviously requiring the full replacement of the piston, but drastically reducing the maintenance costs thereof.

The fixed polarity magnet installed is adapted to move the piston exploiting the attraction and thrust caused by a magnetic field.

Said magnetic field is created by an electromagnet installed on the upper part of the engine, at each piston.

Each electromagnet is adapted to emanate a magnetic field which, thanks to polarity inversion, is able to attract and repel the magnet installed on the fixed polarity piston.

The polarity inversion of the electromagnet is managed by a specific CPU.

The current flow which flows through the electromagnet was therefore inverted by the CPU, by using a H bridge, or a particular configuration of the electrical system which enables the current to invert its flow, therefore inverting the polarity of the magnetic field created by the electromagnet.

The management of said polarity inversion may also be adjusted and optimized, by means of an on-board computer provided for this purpose.

Due to this, the magnet installed on the piston will be subjected to the thrust or attraction depending on the current position of the piston, like in a normal operating cycle of an internal combustion engine, but with the advantage of obtaining said movement through the current flows and not through fuel combustion.

In order to drive the vehicle in electric or hybrid mode, it will be sufficient to exploit a common accumulator (so-called battery) with at least 12 V and with at least 3 Ah (those already used in most current vehicles with an internal combustion engine, have 24 V). Greater power and amperage can be borne by the system in question.

Should there arise the need for full independence from fossil fuel, an electricity accumulation system will need to be implemented by adding one or more accumulators using larger ones.

The vehicle may increase its speed by simply increasing the voltage and the frequency of the polarity changes of the electromagnet. The CPU and any on-board computer provided for this purpose, become significantly important in the vehicle, given that they are responsible for managing the movement of the pistons, of the power and of the speed of the vehicle.

Being positioned outside the engine block, the electromagnets, are comprised within a container which, in an embodiment thereof, is made of steel, plastic or made of composite material comprising a gasket made of plastic material or made of rubber.

Each electromagnet is bound to overheat as the amperage increases progressively. This is why using a cooling system is indispensable.

In an embodiment thereof, the cooling circuit comprises a fan adapted to facilitate heat exchange within the container which comprises the electromagnet.

In a variant thereof, the electromagnet is cooled by using the same coolant present in the vehicle, by means of a dedicated circuit.

A magnetic insulating coating is applied around the walls of the internal combustion engine, adapted to protect the electromagnets and the magnets from other possible interferences and adapted to protect the other electrical and electronic components of the vehicle.

In an embodiment thereof, equipped with the optimization system in question, the engine is adapted to be combined with a common internal combustion engine or with a similar mechanical structure, obtaining a generally hybrid vehicle, adapted to distribute the mechanical energy to the wheels through a single drive shaft.

The internal combustion engine equipped with the optimization system comprises at least a magnetic insulating coating for reducing any magnetic interferences; the presence of a thermal insulating wall, adapted to separate the cylinders driven by the fuel combustion, from the cylinders driven by the magnetic fields emitted by the electromagnets, is further advantageous given that the high temperatures emitted by the combustion would significantly reduce the performance of the electromagnets, further increasing the consumption thereof.

By way of non-limiting example, a method for converting a generic internal combustion engine is comprised in the optimization system subject matter of the invention, comprising a plurality of steps.

There arises the need to start with the removal of the cylinder head and therefore the cam shaft and the mechanisms connected thereto.

Subsequently, the removal of the sparkplug and of the springs which are found above the piston, also allows to remove the entire exhaust system previously used for the burnt gases.

The change in the lubrication system is necessary, given that the elimination of the aforementioned components of the internal combustion engines, replaced by magnets, so as to limit the circulation of the lubricating fluid only to the pistons and cylinders and to the entire engine block underlying the container of the electromagnets, so as to lubricate the piston, the cylinder and the materials therein, the drive shaft and all mobile mechanical components of the engine; following said through-flow, the fluid deposits in the crankcase of the engine where it is collected and recirculated, the entirety being just like in an internal combustion engine.

The cooling system of the current internal combustion engines may be entirely eliminated should the vehicle operate in a full-electric mode, given that there will no longer be any combustion therein, hence significantly reducing the engine management temperatures; the entirety with considerable advantages in terms of maintenance costs, reducing harmful and pollutant emissions and saving the operating costs thereof.

It will be sufficient to solely install a plurality of fans, above each electromagnet, so as to keep the temperatures in the containers low.

The fixing of the magnets on the head of the relative pistons may occur by gluing or hot or cold welding. However, in a variant thereof, said fixing may be eliminated if the pistons are fully replaced by pistons consisting of natural magnets, such as neodymium. Although this variant would reduce the maintenance costs, it would necessarily entail an increase in installation costs, in the step for transforming the internal combustion engine into an electric engine.

The electromagnet is fixed above each piston, on the head of the cylinder or in any case above the latter and at the distance from the piston deemed appropriate.

Subsequently each electromagnet must be connected with an accumulator (battery), with the H bridge, the CPU and the on-board computer if provided, comprised inside the vehicle.

In order to reduce magnetic interferences as well as magnetic emissions in the passenger compartment of the vehicle, there can be installed a magnetic insulating material on the wall of the container in which the electromagnets are located and around the engine.

The advantages offered by the present invention are apparent in the light of the description set forth herein and will be further clarified by the accompanying figures and the detailed description thereof.

DESCRIPTION OF THE FIGURES

The invention will be described hereinafter in at least a preferred embodiment by way of non-limiting example and with the aid of the attached figures, wherein.

Figure 1:
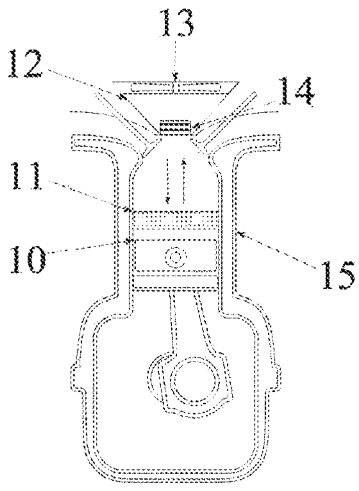
FIG. 1 shows the cross-section of a cylinder 15 of a common internal combustion engine 18. In the section in question, the position of the piston 10, responsible for moving the drive shaft, is outlined. On the head of the piston 10, a magnet 11 is installed that is adapted to maintain a fixed polarity, which will be attracted or repelled by the alternating polarity of the electromagnet 14, comprised in a container 12. A fan 13 is installed above said container 12, and it is adapted to cool the electromagnet 14 comprised therein during the operating steps.

13, the electromagnets 14 are arranged which are managed by a CPU 17, installed above said magnetic motor. Said CPU 17 coordinates the motion of the pistons 10 varying the intensity of the voltage by means of an electric circuit 16, also possibly by means of an on-board computer, located inside the vehicle. A magnetic insulating coating 21 is installed around the walls of the engine, and it is adapted to reduce the magnetic interferences which could involve the magnetic motor. The drive shaft 20 is shared by both engines, and it is adapted to transmit motion to the wheels exploiting the movement of the pistons 10 of the magnetic motor and the movement of the pistons of the internal combustion engine 18. A thermal insulating wall 22 is installed between the two motors so as to reduce the heat flow emitted by the internal combustion engine 18 therefore avoiding to reduce the performance of the electromagnets 14.

Figure 4:
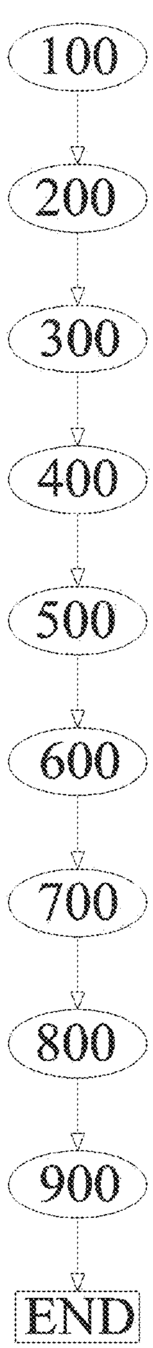

FIG. 4 shows the flow chart subject of the method comprised in the optimization system subject of the invention.

DETAILED DESCRIPTION OF THE INVENTION

The present invention will now be illustrated by way of non-limiting or binding example, using the figures which illustrate some embodiments in relation to the present inventive concept.

With reference to FIG. 1, a common internal combustion engine 18 is shown, modified and optimized according to the present invention.

Moving in an alternating fashion in the cylinder 15, the piston 10 keeps the drive shaft rotating to transmit mechanical energy to the wheels of the vehicle.

Although said alternating movement of the piston 10 is commonly generated by an explosion of fossil fuel, in the present invention such movement is guaranteed by the magnetic field emitted by the electromagnet 14 installed above said piston 10.

The electromagnet 14 is adapted to invert the polarity of the emitted magnetic field, attracting and repelling the fixed polarity magnet 11 installed above said piston 10.

Said electromagnet 14 is comprised in a container 12 which—in an embodiment thereof—is made of composite material.

Said container 12 comprises an opening adapted to house a fan 13 which is in turn adapted to cool the electromagnet 14 in the most active operating steps and the fissures adapted to disperse the excess heat.

Figure 2:
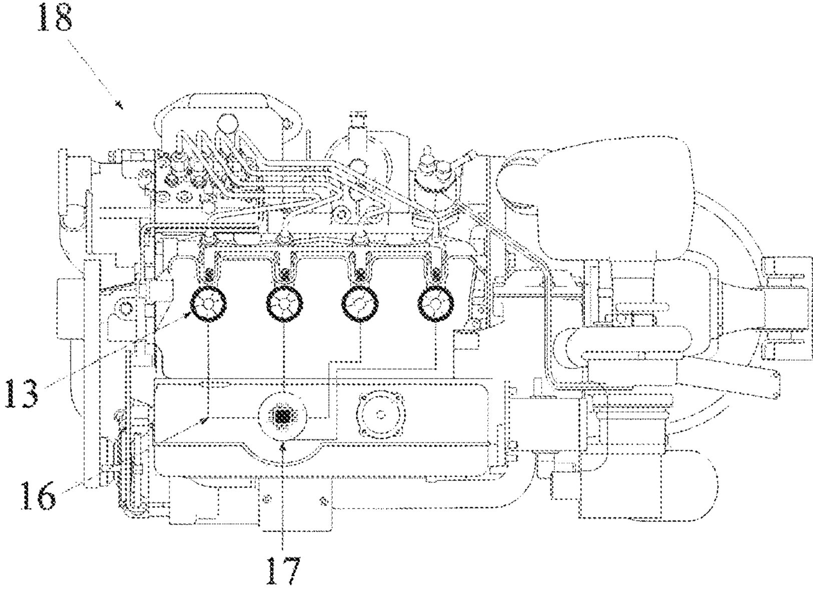
FIG. 2 shows an upper view of a common internal combustion engine 18. The positions in which the cooling fans 13 were installed are clear. Below said fans 13, the electromagnets 14 are arranged, installed above each piston of said internal combustion engine 18; the electromagnets 14 are managed by a H bridge, connected to a CPU 17. Said CPU 17 coordinates the motion of the pistons 10 varying the frequency of the changes of polarity of the electromagnets 14 and the intensity of the voltage, through an electric circuit 16.

With reference to FIG. 2, an upper view of a common internal combustion engine 18 is shown.

The polarity of the magnetic field emitted by the electromagnet 14 is inverted, through a H bridge, adapted to collaborate with the electric circuit 16 so as to adjust the intensity of the magnetic field by varying the voltage.

Each electromagnet 14 is coordinated by a CPU 17 which is adapted to read the needs of the driver and dispense the power required by the system in question, even through an on-board computer adapted to manage and optimize said polarity inversion, its frequency, the intensity and the power of the relative magnetic field.

Each electromagnet 14 requires a cooling system which in this case is obtained by means of fans 13, installed above each container 12.

Figure 3:
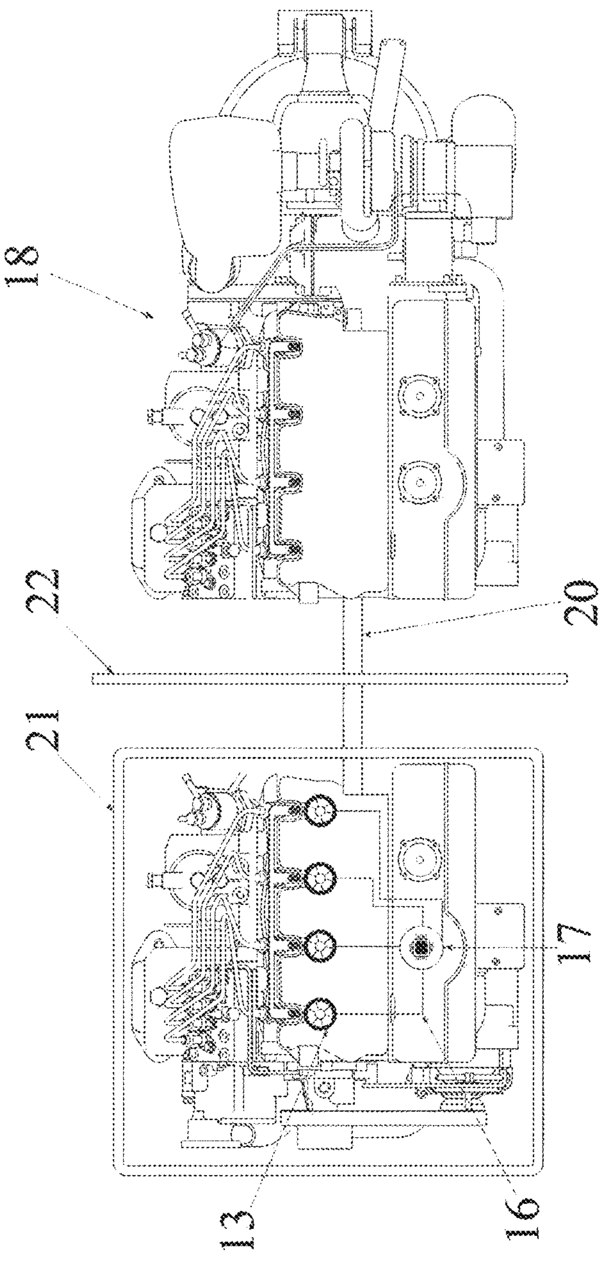
FIG. 3 shows an upper view of the combination of a common internal combustion engine 18, with a magnetic motor. The positions in which the cooling fans 13 were installed at the relative pistons 10 are clear. Below said fans

With reference to FIG. 3, an upper view of a common internal combustion engine 18 combined with a magnetic motor is shown, so as to create a generally hybrid vehicle, adapted to distribute the mechanical energy to the wheels through a single drive shaft 20.

The polarity of the magnetic field emitted by the electromagnet 14 is inverted through a H bridge.

Each electromagnet 14 is coordinated by a CPU 17 which is adapted to read the needs of the driver and dispense the power and the intensity of the current required by the system in question. The entirety, even through an on-board computer adapted to manage and optimize said polarity inversion, the frequency thereof and the power of the relative magnetic field.

Each electromagnet 14 requires a cooling system which in this case is obtained by means of fans 13, installed above each container 12.

The magnetic motor comprises an anti-magnetic coating 21 adapted to insulate the engine block, avoiding electromagnetic interferences with the passenger compartment of the vehicle or with the surrounding environment.

A thermal insulating wall 22 is further installed between the two motors and it is adapted to reduce the heat flow emitted by the combustion which occurs within the internal combustion engine 18, safeguarding the performance of the electromagnets 14 comprised in the magnetic motor; given that said electromagnets 14 and magnets 11 have lower efficiency if overheated. With reference to FIG. 4, a flow chart is shown which sets the steps required to complete the conversion of an internal combustion engine 18 into an electric engine, comprising the steps of:

- removing 100 the cam shaft and the mechanisms connected thereto;
- removing 200 the sparkplug and the valves, designated for the introduction of the fuel and the release of burnt gases;
- modifying 300 the lubrication system conveying the lubricating fluid into the pistons 10, lubricating the piston 10, the cylinder, the elastic bands and the drive shaft 20; following said through-flow, the fluid deposits in the crankcase so as to be collected and recirculated;
- fixing 400 the magnets 11 on the head of the relative pistons 10;
- fixing 500 an electromagnet 14 above each piston 10, on the head of the cylinder;
- connecting 600 each electromagnet 14 with the battery, with the H bridge, with the CPU 17 and possibly with the on-board computer, comprised inside the vehicle;
- installing 700 a fan 13, above each electromagnet 14, adapted to keep the temperatures inside the container 12 low;
- installing 900 an anti-magnetic coating 21 on the walls of the container 12, of the compartments and of the engine 18, adapted to reduce the magnetic radiations.

Lastly, it is clear that modifications, additions or variations which are obvious to a person skilled in the art may be applied to the invention described heretofore without departing from the scope of protection provided by the attached claims.

The invention claimed is:

1. A system for modifying an internal combustion engine fueled by fossil fuel, to reduce fuel consumption, said system comprising:

- an internal combustion engine comprising an engine block containing pistons that slide inside corresponding cylinders, the pistons being adapted to move a drive shaft;
- at least one magnet, installed on a head of each piston, having a fixed polarity;

at least one electromagnet, installed above each piston to be moved, adapted to invert the polarity thereof, attracting and repelling the magnet installed on its corresponding piston;

said magnet being adapted to move its corresponding piston due to inversion of polarity of said electromagnet installed above it;

at least one electric circuit, adapted to adjust an intensity of a magnetic field by changing voltage, by increasing attraction and thrust force due to polarization of the electromagnet;

at least one CPU, adapted to invert the polarity of the electromagnet by using an H bridge, the H bridge being adapted to invert the current flow which supplies the electromagnet;

at least one accumulator with voltage values of at least 12V and electric charge of at least 3 Ah, adapted to supply the electromagnet by the electric circuit;

at least one container, located above each piston, adapted to contain the electromagnet which moves the corresponding piston;

at least one system for cooling the electromagnet adapted to improve performance thereof, and reduce electricity consumption due to overheating of the system;

at least one magnetic insulating coating, applied around the walls of the internal combustion engine, adapted to protect the electromagnets and the magnets from interference and to protect a passenger compartment of a vehicle in which said system is mounted from magnetic interference;

said cooling system comprising a fan installed above each said at least one container.

2. The system according to claim 1, wherein said magnet, installed on the head of its respective piston, is made of neodymium.

3. The system according to claim 1, wherein said magnet is installed on the head of its respective piston by gluing.

4. The system according to claim 1, wherein said magnet is installed on the head of its respective piston by welding.

5. The system according to claim 1, wherein said magnet is installed in a steel container welded on the head of its respective piston.

6. The system according to claim 1, wherein said magnet is installed in a steel container glued on the head of its respective piston.

7. The system according to claim 1, wherein said piston is entirely made with a magnet having a fixed polarity.

8. The system according to claim 1, wherein cooling of the electromagnet is effected with a refrigerant.

9. The system according to claim 1, wherein said container is made of composite material comprising a gasket made of plastic or rubber material.

10. The system according to claim 1, wherein said container is made of steel comprising a gasket made of plastic or rubber material.

11. The system according to claim 1, wherein said electric circuit comprises a plurality of diodes adapted to protect electrical components of said system from current overcharge.

12. The system according to claim 1, wherein said electric circuit is connected to the CPU, adapted to invert the polarity of the electromagnet by using the H bridge adapted to invert the current flow which supplies the electromagnet, and by using an on-board computer adapted to adjust said inversion of polarity of the electromagnet, to control frequency thereof, and hence speed and power of the engine.

13. The system according to claim 1, wherein said internal combustion engine, is adapted to be combined with a further internal combustion engine; said system comprising:

an internal combustion engine comprising components for combustion and circulation of burnt gases;

at least one elongated drive shaft, adapted to accommodate pistons in addition to those of the internal combustion engine;

a plurality of electromagnets, to be installed above each piston to be moved magnetically, adapted to invert the polarity thereof, attracting and repelling the magnets installed on the corresponding pistons;

a plurality of magnets having fixed polarity; the magnets being adapted to move their respective pistons by inversion of the polarity of said electromagnets installed thereabove;

a plurality of electric circuits, adapted to adjust intensity of a magnetic field by changing voltage, increasing attraction and thrust force due to polarization of the electromagnet;

at least one CPU, adapted to adjust the electric pulses and the inversion of polarity of the electromagnet, managing the current flows inside the magnetic motor;

at least one H bridge, paired with a CPU and with a possible on-board computer, adapted to manage and optimize the inversion of the current flow which supplies the electromagnet in question;

a plurality of electric circuits, adapted to connect an accumulator of the type already comprises inside a common internal combustion engine vehicle, with at least 12 V and 3 Ah, with the electromagnets comprised inside the optimized internal combustion engine;

at least one container, located at each piston belonging to the optimized internal combustion engine, adapted to comprise—therein—the electromagnet which moves the relative piston;

a plurality of fans, comprised inside the containers, adapted to keep the electromagnet at low temperatures reducing the electricity consumptions due to the overheating of the system;

at least one magnetic insulating coating adapted to insulate the optimized internal combustion engine from possible magnetic interferences;

at least one thermal insulating wall, adapted to separate the cylinders actuated by fuel combustion, by the cylinders actuated by the magnetic fields emitted by the electromagnets, given that the high temperatures emitted by the combustion would significantly reduce the performance of the electromagnets further increasing the consumptions thereof.

14. The system according to claim 1, wherein it is adapted to perform a method for converting an internal combustion engine to an electric engine comprising the steps of:

removing a cam shaft and mechanisms linked therewith;

removing spark plugs and valves, designated for introduction of fuel and release of burnt gases;

modifying a lubrication system conveying lubricating fluid into the pistons, lubricating the pistons and the drive shaft; following said through-flow of the fluid it deposits in the crankcase so as to be collected and recirculated;

fixing magnets on the heads of the corresponding pistons;

fixing an electromagnet above each piston, on the head of the cylinder;

connecting each electromagnet with a battery, with the H bridge, with the CPU and an on-board computer, comprised inside a vehicle;

installing a fan, above each electromagnet, adapted to keep temperatures inside the container low; and installing an anti-magnetic coating on walls of the container and of the engine, adapted to reduce magnetic radiation.

15. The system according to claim 14, adapted to perform a method for converting an internal combustion engine into an electric engine, without removing mechanical components of the internal combustion engine, by adding a magnet on each piston and an electromagnet above each piston, comprising the steps of:

fixing the magnets on the head of the relative pistons;

fixing an electromagnet above each piston, on the head of the cylinder;

connecting each electromagnet with the battery, with the H bridge, with the CPU and possibly with the on-board computer, comprised inside the vehicle;

installing a fan, above each electromagnet, adapted to keep temperatures inside the container low;

installing an anti-magnetic coating on the walls of the container, of the compartments and of the engine, adapted to reduce magnetic radiation.

* * * * *